United States Patent
Rigazio et al.

(10) Patent No.: US 6,526,379 B1
(45) Date of Patent: Feb. 25, 2003

(54) DISCRIMINATIVE CLUSTERING METHODS FOR AUTOMATIC SPEECH RECOGNITION

(75) Inventors: Luca Rigazio, Santa Barbara, CA (US); Brice Tsakam, Vernier (CH); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,387

(22) Filed: Nov. 29, 1999

(51) Int. Cl.$^7$ ................................. G10L 15/06
(52) U.S. Cl. .............. 704/245; 704/256; 704/255; 704/246; 704/243; 704/244
(58) Field of Search ................... 704/245, 256, 704/255, 240, 243, 244, 236, 246, 222, 231, 238

(56) References Cited

U.S. PATENT DOCUMENTS

| | | |
|---|---|---|
| 4,718,088 A | 1/1988 | Baker et al. |
| 4,817,156 A | 3/1989 | Bahl et al. |
| 4,829,577 A | 5/1989 | Kuroda et al. |
| 4,903,035 A | 2/1990 | Kropielnicki et al. |
| 5,046,099 A | 9/1991 | Nishimura |
| 5,050,215 A | 9/1991 | Nishimura |
| 5,127,055 A | 6/1992 | Larkey |
| 5,150,449 A | 9/1992 | Yoshida et al. |
| 5,170,432 A | 12/1992 | Hackbarth et al. |
| 5,233,681 A | 8/1993 | Bahl et al. |
| 5,280,562 A | 1/1994 | Bahl et al. |
| 5,293,584 A | 3/1994 | Brown et al. |
| 5,375,173 A | 12/1994 | Sanada et al. |
| 5,473,728 A | 12/1995 | Luginbuhl et al. |
| 5,522,011 A | 5/1996 | Epstein et al. |
| 5,579,436 A | 11/1996 | Chou et al. |
| 5,617,486 A | 4/1997 | Chow et al. |
| 5,651,094 A | 7/1997 | Takagi et al. |
| 5,664,059 A | 9/1997 | Zhao |
| 5,737,723 A | 4/1998 | Riley et al. |
| 5,778,342 A | 7/1998 | Erell et al. |
| 5,787,394 A | 7/1998 | Bahl et al. |
| 5,793,891 A | 8/1998 | Takahashi et al. |
| 5,794,192 A | 8/1998 | Zhao |
| 5,806,029 A | 9/1998 | Buhrke et al. |
| 5,812,975 A * | 9/1998 | Komori et al. ............. 704/236 |
| 5,825,978 A | 10/1998 | Digalakis et al. |
| 5,839,105 A | 11/1998 | Ostendorf et al. |
| 5,842,163 A | 11/1998 | Weintraub |
| 5,864,810 A | 1/1999 | Digalakis |
| 5,890,114 A | 3/1999 | Yi |
| 5,895,447 A * | 4/1999 | Ittycheriah et al. ......... 704/231 |
| 5,912,989 A * | 6/1999 | Watanabe ................... 382/215 |
| 5,983,178 A * | 11/1999 | Naito et al. ................. 704/245 |
| 6,073,096 A * | 6/2000 | Gao et al. ................... 704/245 |
| 6,108,628 A * | 8/2000 | Komori et al. ............. 704/238 |
| 6,223,159 B1 * | 4/2001 | Ishii .............................. 704/247 |
| 6,263,309 B1 * | 7/2001 | Nguyen et al. ............. 704/231 |
| 6,336,108 B1 * | 1/2002 | Thiesson et al. ............ 704/256 |
| 6,343,267 B1 * | 1/2002 | Kuhn et al. ................. 704/222 |

OTHER PUBLICATIONS

Abrash et al., ("Acoustic adaptation using nonlinear transformations of HMM parameters", ICASSP–96, Conference proceedings., 1996 IEEE Conference on Acoustics, Speech, and Signal processing, 1996, vol.2, pp. 729–732, May 1996).*

V. Digalakis, et al., Rapid speech recognizer adaptation to new speakers, Tech. Univ. of Crete, Chania, Greece, pp. 765–768, vol. 2, Mar. 1999.

(List continued on next page.)

*Primary Examiner*—Vijay Chawan
(74) *Attorney, Agent, or Firm*—Harness, Dickey & Pierce, PLC

(57) ABSTRACT

The discriminative clustering technique tests a provided set of Gaussian distributions corresponding to an acoustic vector space. A distance metric, such as the Bhattacharyya distance, is used to assess which distributions are sufficiently proximal to be merged into a new distribution. Merging is accomplished by computing the centroid of the new distribution by minimizing the Bhattacharyya distance between the parameters of the Gaussian distributions being merged.

13 Claims, 4 Drawing Sheets

OTHER PUBLICATIONS

S.J. Cox, et al., Simultaneous speaker normalisation and utterance labelling using Bayesian/neural net techniques, British Telecom Res. Lab., Ipswich, UK, pp. 161–164, vol. 1, Apr. 1990.

Yunxin Zhao, An acoustic–phonetic–based speaker adaptation technique for improving speaker–independent continuous speech recognition, Speech technol. Lab., Panasonic Technol. Inc., Santa Barbara, CA, USA, pp. 380–394, vol. 2, Jul. 1994.

V. Abrash et al., Acoustic adaptation using nonlinear transformations of HMM parameters, Speech Res. & Technol. Lab., SRI Int., Menlo Park, CA, USA, pp. 729–732, vol. 2, May 1996.

R. Kuhn, et al., Eigenfaces and eigenvoices: dimensionally reduction for specialized pattern recognition, Panasonic Technol.–STL, Santa Barbara, CA, USA, pp. 71–76, Dec. 1998.

J.–L. Gauvain, et al., Improved acoustic modeling with Bayesian learning, AT&T Bell Labs., Murray Hill, NJ, USA, pp. 481–484, vol. 1, Mar. 1992.

Ming–Whei Feng, Speaker Adaptation Based on Spectral Normalization and Dynamic HMM Parameter Adaptation, GTE Laboratories Inc., IEEE, 1995, pp. 704–707.

J. McDonough, et al., Speaker–adapted training on the Switchboard Corpus, BBN Syst. & Technols., Cambridge, MA, USA, pp. 1059–1062, vol. 2, Apr. 1997.

Brian Mak, et al., Phone Clustering Using the Bhattacharyya Distance, Center for Spoken Language Understanding, Oregon Graduate Institute of Science and Technology.

W. Chou, et al., Segmental GPD Training of HMM Based Speech Recognizer, AT&T Bell Laboratories, IEEE, Sep. 1992, pp. I–473–I–476.

Alejandro Acero, et al., Speaker and Gender Normalization for Continuous–Density Hidden Markov Models, Microsoft Corporation, IEEE, Mar. 1996, pp. 342–345.

Ariane Lazarides, et al., Improving Decision Trees for Acoustic Modeling, Locus Speech Corporation, pp. 1053–1056.

Roland Kuhn, et al., Improved Decision Trees for Phonetic Modeling, Centre de recherche informatique de Montreal, IEEE, May 1995, pp. 552–555.

Yunxin Zhao, Overcoming Speaker Variability in Automatic Speech Recognition, The Speaker Adaptation Approach, pp. 191–209.

Chapters 9 and 10 of Talker Variability in Speech Processing, pp. 167–189, Academic Press, 1997.

* cited by examiner

DISCRIMINATIVE CLUSTERING METHODS FOR AUTOMATIC SPEECH RECOGNITION

BACKGROUND AND SUMMARY OF THE INVENTION

The present invention relates generally to statistical model-based speech recognition systems. More particularly, the invention relates to a system and method for improving the accuracy of acoustic models used by the recognition system while at the same time controlling the number of parameters. The discriminative clustering technique allows robust recognizers of small size to be constructed for resource-limited applications such as in embedded systems and consumer products.

Much of the automatic speech recognition technology today relies upon Hidden Markov Model (HMM) representation of features extracted from digitally recorded speech. A Hidden Markov Model is represented by a set of states, a set of vectors defining transitions between certain pairs of states, probabilities that apply to state-to-state transitions and further sets of probabilities characterizing observed output symbols and initial conditions. Frequently the probabilities associated with the Hidden Markov Model are represented as Gaussians expressed by representing the mean and variance as floating point numbers.

Hidden Markov Models can become quite complex, particularly as the number of states representing each speech unit is increased and as more complex Gaussian mixture density components are used. Complexity is further compounded by the need to have additional sets of models to support context-dependent recognition. For example, to support context-dependent recognition in a recognizer that models phonemes, different sets of Gaussians are typically required to represent the different allophones of each phoneme.

The above complexity carries a price. Recognizers with more sophisticated, and hence more robust, models typically require a large amount of memory and processing power. This places a heavy burden on embedded systems and speech-enabled consumer products, because these typically do not have much memory or processing power to spare. What is needed, therefore, is a technique for reducing the number of Gaussians needed to represent speech, while retaining as much accuracy as possible. For the design of memory-restricted embedded systems and computer products, the most useful solution would give the system designer control over the total number of parameters used.

The present invention provides a technique for improving modeling power while reducing the number of parameters. In its preferred embodiment, the technique takes a bottom-up approach for defining clusters of Gaussians that are sufficiently close to one another to warrant being merged. In its preferred form, the technique begins with as many clusters as Gaussians used to represent the states of the Hidden Markov Models. Clusters are then agglomerated, in tree fashion, to minimize the dispersion inside the cluster and to maximize the separation between clusters. The agglomerative process proceeds until the desired number of clusters is reached. The system designer may specify the desired number based on memory footprint and processing architecture. A Lloyd-Max clustering algorithm is then performed to move Gaussians from one cluster to another in order to further decrease the dispersion within clusters.

Unlike conventional systems that tend to merely average Gaussian mean and variance values together, the method of the present invention employs a powerful set of equations that provides the parameters representative of each cluster (e.g. centroid), so that the Bhattacharyya distance is minimized inside the cluster. This provides a far better way of estimating the parameters representative of the cluster, because it is consistent with the metric used to associate the Gaussians to the cluster itself. In the preferred implementation, the Bhattacharyya distance is minimized through an iterative procedure that we call the minimum mean Bhattacharyya center algorithm.

For a more complete understanding of the invention, its objects and advantages, refer to the following specification and to the accompanying drawings.

DESCRIPTION OF THE PREFERRED EMBODIMENT

Figure 1:
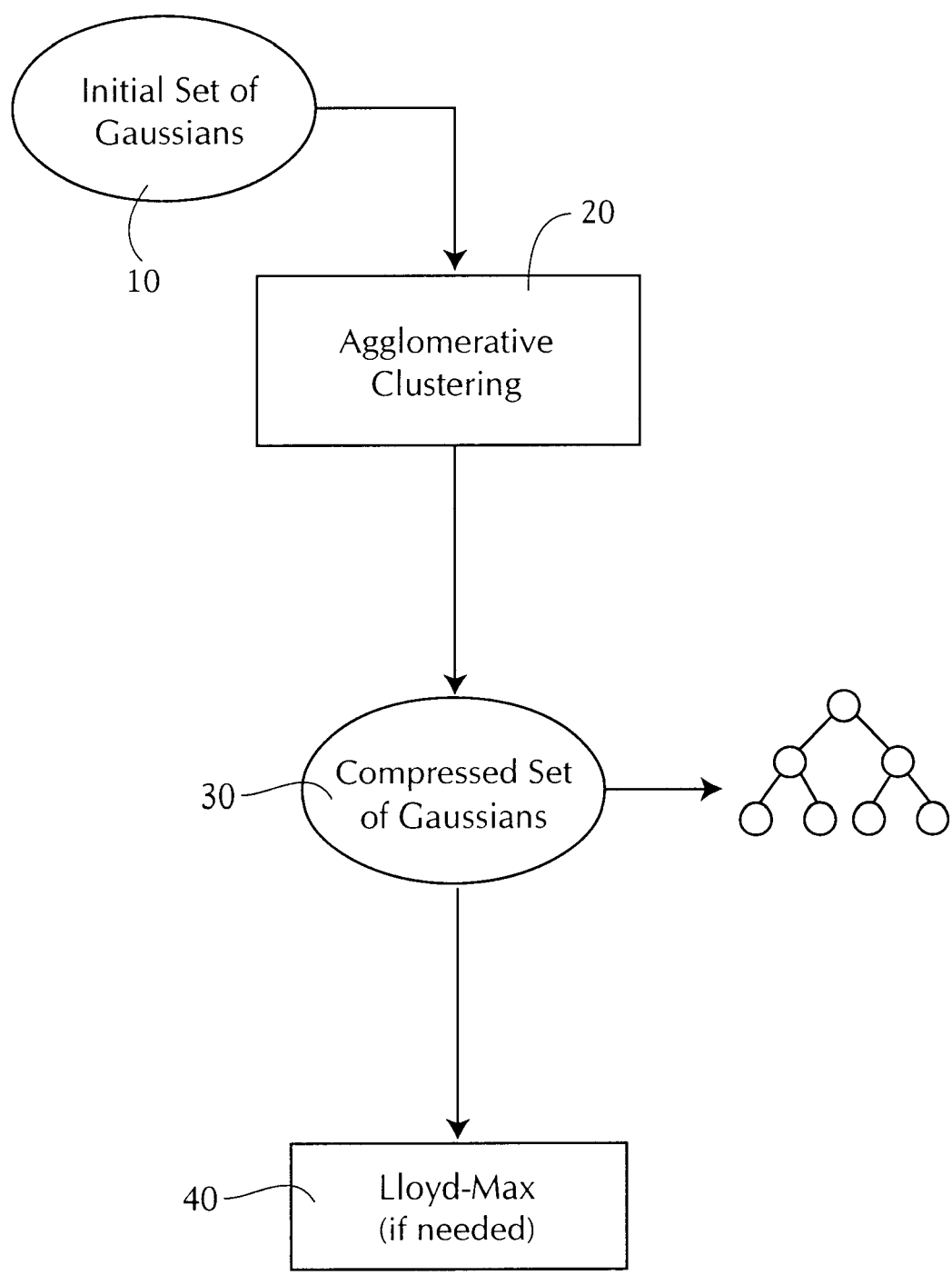
FIG. 1 is a block diagram presenting an overview of the bottomup clustering method of the preferred embodiment.

The presently preferred embodiment of the discriminative clustering technique is designed to work with an initial set of Gaussian distributions shown at 10 in FIG. 1. By operation of the discriminative clustering method, this initial set is compressed as illustrated at 30. In essence, the method minimizes redundancy in the speech models while preserving as much relevant information as possible. As noted above, typically the Hidden Markov Model is used to represent sound units in the language, such as words, subwords, phonemes or the like, by quantizing sequences of acoustic vectors. This acoustic vector space is commonly represented using Gaussian distributions. Thus, conceptually, the sound units of a language may be represented by a dictionary of Gaussian distributions. The invention is designed to compress this Gaussian dictionary while preserving the information needed to properly model the different acoustic vectors needed to perform accurate speech recognition. The presently preferred embodiment employs an agglomerative clustering algorithm 20 to form the compressed set of gaussians 30. A Lloyd-Max process 40 may then be performed on the compressed set of gaussians, if desired.

Figure 2:
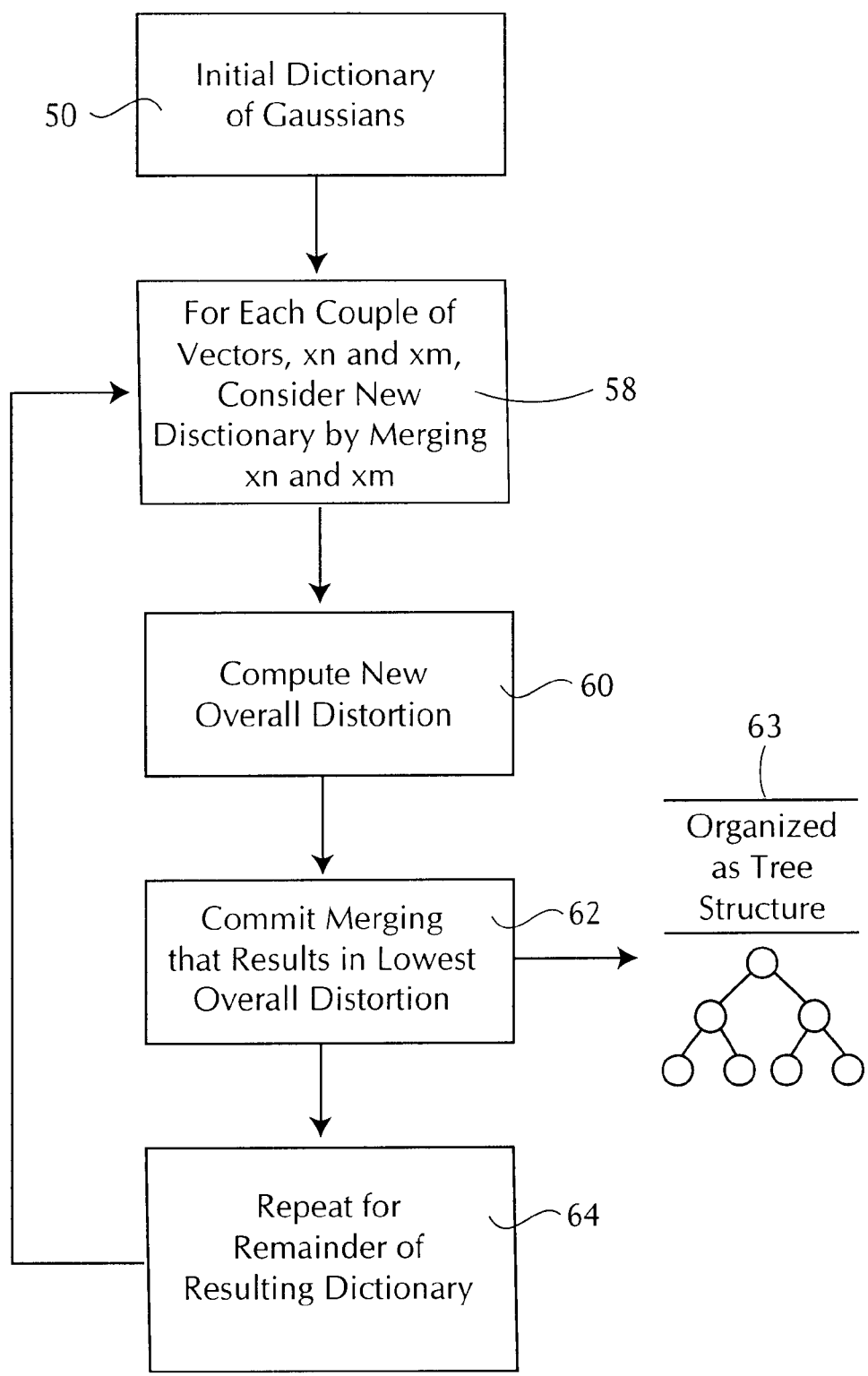
FIG. 2 is a flowchart illustrating the presently preferred agglomerative clustering technique in greater detail.

FIG. 2 shows the agglomerative clustering algorithm. An objective of the algorithm is to merge distributions which return similar likelihoods and hence do not help much in the recognition process. The basic principle of agglomerative clustering is to start from an initial set of vectors which are treated as leaves of a tree structure. The procedure than proceeds to merge vectors with the objective of increasing overall distortion as little as possible. The procedure is repeated iteratively until the desired number of clusters remains. Overall distortion is assessed by a distance measurement. The presently preferred embodiment uses a Bhaftacharyya distance measurement. Thus the overall distortion may be represented as follows:

$$d_{overall} = \Sigma_{i=1}^{N} \Sigma_{j-1}^{M_i} d(x_i, td_{ij})$$

where $td_{ij}$ is the jth sample of data associated with the cluster $x_i$.

[1](gaussian distribution)

Referring to FIG. 2, the clustering algorithm begins with an initial set of Gaussians 50. Then, for each couple of vectors $x_n$, $x_m$, the procedure considers at step 58 a new dictionary by temporarily merging the vector couple $x_n$ and $x_m$. Then, at step 60, a new overall distortion is computed. The new overall distortion is then tested at 62 and the merging of vectors $x_n$ and $x_m$ is committed if doing so will result in the lowest overall distortion. The results may be organized as a tree structure 63. The procedure is then repeated as at 64 for the remainder of the resulting dictionary.

The algorithm of FIG. 2 can be made less complex by computing the increase in distortion rather than the overall distortion at step 60. This is done by comparing the distortion due to a couple of vectors with the distortion resulting when they are merged. This increase in distortion may be calculated as set forth in the equation below.

$$\Delta d = \Sigma_{j=1}^{M_n} d(x', td_{nj}) - d(x_n, td_{nj}) + \Sigma_{j=1}^{M_m} d(x', td_{mj}) - d(x_m, td_{mj})$$

After computing the increase in distortion the proposed merging of two vectors is committed if it results in the lowest distortion increase.

One advantage of the agglomerative clustering procedure is that it does a good job of identifying small and concentrated populations. However, if allowed to proceed unchecked, it can grow clusters that become too large and hence no longer are able to discriminate effectively between different sound units.

To avoid oversized clusters, the distance measure can be weighted with the number of gaussians belonging to a cluster to penalize overused clusters. Cluster with a smaller number of belonging gaussians will show a smaller distortion.

Figure 3:
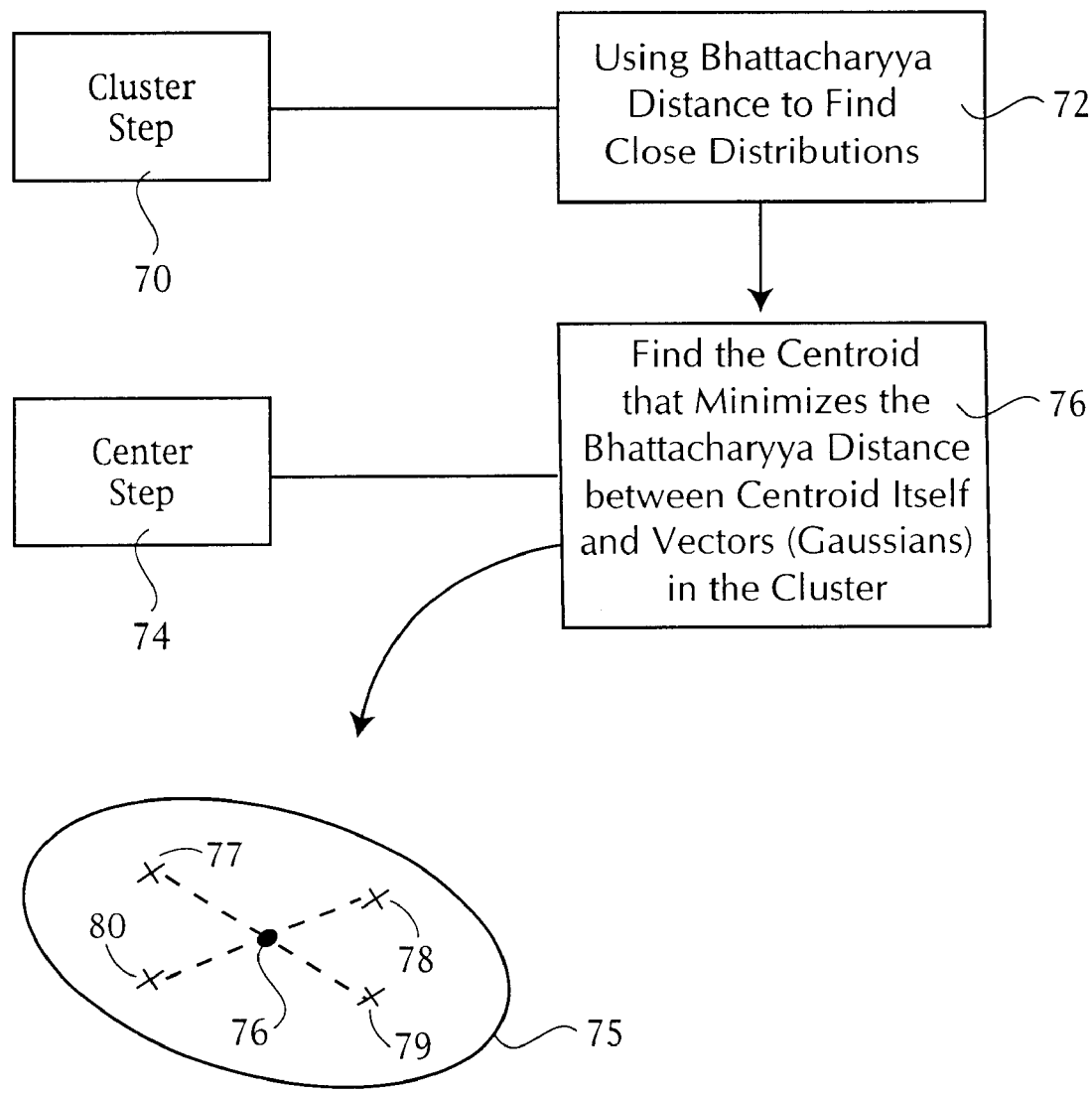
FIG. 3 is a block diagram giving an overview of how the Bhattacharyya distance is used in both the clustering step and the center step.

The preferred embodiment uses the Bhattacharyya distance as a metric for both cluster formation and subsequent computation of the new cluster's centroid. FIG. 3 illustrates this. In FIG. 3 the cluster formation step 70 uses the Bhattacharyya distance to find the gaussians that are close enough together to warrant being merged, as indicated at step 72.

The preferred technique is based on a computation of the Bhattacharyya distance 14, which may be computed for two Gaussian distributions $g_1$ and $g_2$ as follows:

$$D_{bhat}(g_1, g_2) = \frac{1}{8} * (\mu_2 - \mu_1)^T * \left[\frac{\Sigma_1 + \Sigma_2}{2}\right]^{-1} * (\mu_2 - \mu_1) + \frac{1}{2} \ln \frac{\left|\frac{\Sigma_1 + \Sigma_2}{2}\right|}{\sqrt{|\Sigma_1| * |\Sigma_2|}}$$

where $\mu_1$ and $\mu_2$ are the mean vectors associated with distributions $g_1$ and $g_2$ and $\Sigma_1$ and $\Sigma_2$ are the respective covariance matrices.

After determining which Gaussian distributions to merge, the procedure next computes the centroid resulting from the merging of two or more Gaussian distributions as indicated at step 74. The center step 74 involves finding the centroid that minimizes the Bhattacharyya distance between the center and the vectors (gaussians) in the cluster, as indicated at 76.

FIG. 3 illustrates a representative cluster at 75 having a centroid 76 and containing a plurality of gaussian distributions 77–80. The Bhattacharyya distances between the centroid 76 and the respective distributions. The center step 74, in effect, minimizes the sum of the Bhattacharyya distances (shown in dotted lines).

The Bhattacharyya centroid is computed iteratively, after first being initialized as the maximum likelihood centroid. The maximum likelihood centroid corresponds to maximum likelihood estimation on the training data associated with the distributions in the cluster. For Cluster which contains the Gaussian distribution's $g_i$ with a weight of $w_i$, i=1, ..., N, the Bhattacharyya centroid (mean and standard deviation) may be computed as shown in Equations 1 and 2 below.

For diagonal covariance matrices our procedure can be based on the following equations, where $\sigma^2$ is the variance and $\mu$ is the mean associated with a specific component of the feature vector.

$$\mu_c = \frac{\sum_i w_i * (\sigma_c^2 + \sigma_i^2)^{-1} * \mu_i}{\sum_i w_i * (\sigma_c^2 + \sigma_i^2)^{-1}} \quad \text{Equation 1}$$

$$\sigma_c^2 = \frac{\sum_i w_i}{\sum_i w_i * \left[\frac{2}{\sigma_c^2 + \sigma_i^2} - \left(\frac{\mu_c - \mu_i}{\sigma_c^2 + \sigma_i^2}\right)^2\right]} \quad \text{Equation 2}$$

Use of the above Equations 1 and 2 results in a significant improvement over conventional clustering techniques. Unlike conventional techniques that merely seek average value of the means of Gaussians belonging to a cluster, the above equations actually provide the parameters of the cluster so that the Bhattacharyya distance is minimized inside the cluster. Note that the parameters representative of the cluster are consistent with the metric used to associate the Gaussians to the cluster itself. Equations 1 and 2 comprise a coherent set of equations that represent a uniform criteria for computing the cluster centers. These equations may be solved iteratively as will now be described.

Figure 4:
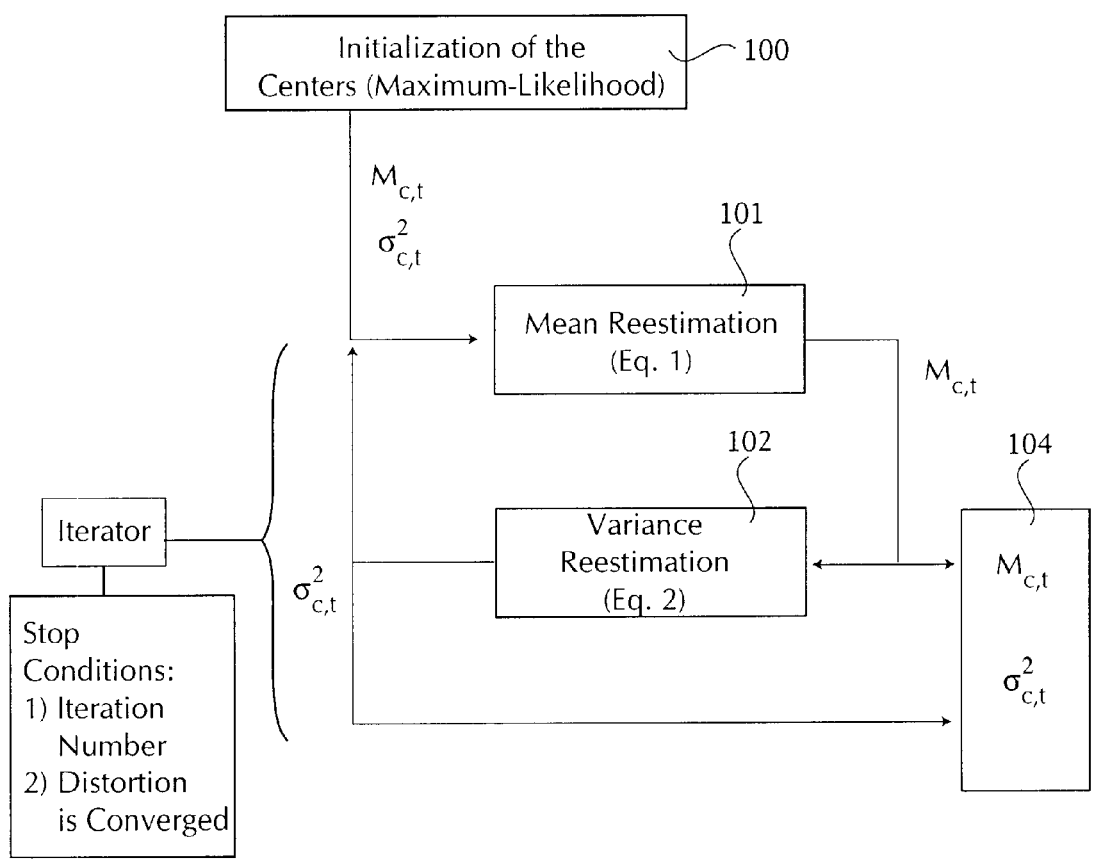
FIG. 4 is a flowchart illustrating the presently preferred iterative technique for performing the center step.

The above equations 1 and 2 are computed iteratively using the algorithm illustrated in FIG. 4. Beginning at step 100, the algorithm initializes the centers of each centroid using a maximum likelihood calculation. The means and variances are then fed to respective re-estimation calculation blocks 101 and 102. The re-estimation calculation block 101 implements above equation 1 and calculation block 102 implements above equation 2.

Note that the output of calculation block 101 represents a re-estimated mean, which is fed back as an input to calculation block 102. The output of block 102 represents a re-estimated variance. The output of block 102 is fed into block 101 as an input, as illustrated. Thus each calculation block 101 and 102 provides its output as an input to the other block. The calculations performed at blocks 101 and 102 are designed to operate iteratively until a stop condition is met. The stop condition can be either: (1) a predetermined number of iterations or (2) upon achieving a convergence in the distortion. After iteration has ceased, the final means and variance values are output as at 104 to be used as the new centroids for the cluster, now optimized with respect to the Bhattacharyya distance.

From the foregoing, it will be understood that the presently preferred discriminative clustering technique exploits the Bhattacharyya distance to find the gaussians that are close enough to warrant being assigned to the same cluster. The technique further exploits the Bhattacharyya distance in recomputing a new centroid for the cluster in terms of optimized mean and variance values based on equations 1 and 2 recited above. These equations are efficiently solved through an iterative technique in which the re-estimation of the mean is used in calculating the re-estimation of the variance, and vice versa.

While the invention has been described in its presently preferred form, it will be understood that the invention is capable of modification without departing from the spirit of the invention as set forth in the appended claims.

What is claimed is:

1. A discriminative clustering method for automatic speech recognition, comprising:
   providing a set of Gaussian distributions corresponding an acoustic vector space;
   testing said distributions to identify selected distributions having a predetermined proximity to one another based on a distance measure and merging said selected distributions into at least one new distribution;
   computing the centroid of said new distribution by minimizing the Bhattacharyya distance between selected distribution and its centroid.

2. The method of claim 1 wherein said distance measure is the Bhattacharyya distance.

3. The method of claim 1 further comprising organizing said set of Gaussian distributions into a tree structure and wherein said testing said distributions is performed following said tree structure.

4. The method of claim 1 wherein said merging step is performed by selecting a couple of distributions, computing an overall distortion resulting from the merging of said couple of distributions and committing said merging if that results in a lower overall distortion.

5. The method of claim 1 wherein said merging step is iteratively performed by selecting a couple of distributions, computing an overall distortion resulting from the merging of said couple of distributions and committing said merging if that results in a lower overall distortion.

6. The method of claim 1 further comprising performing a Lloyd-Max process on said new distribution.

7. A method for automatic speech recognition, comprising:
   providing a set of Gaussian distributions corresponding an acoustic vector space;
   a step for testing said distributions to identify selected distributions;
   a step for merging said selected distributions into at least one new distribution; and
   a step for computing the centroid of said new distribution.

8. The method of claim 7 further comprising a step for organizing said set of Gaussian distributions into a tree structure following said step for testing said distributions.

9. The method of claim 7 further comprising a step for iteratively performing said step for merging said selected distributions.

10. A discriminative clustering method for automatic speech recognition, comprising:
    providing a set of Gaussian distributions corresponding an acoustic vector space;
    computing a Bhattacharyya distance measure between each of said distributions;
    selecting distributions having a predetermined proximity to one another based on a distance measure; and
    merging said selected distributions into at least one new distribution.

11. The method of claim 10 wherein the Bhattacharyya distance between two Gaussian distributions $g_1$ and $g_2$ is computed in accordance with $$D_{bhat}(g_1, g_2) = \frac{1}{8} * (\mu_2 - \mu_1)^T * \left[\frac{\Sigma_1 + \Sigma_2}{2}\right]^{-1} * (\mu_2 - \mu_1) + \frac{1}{2}\ln\frac{\left|\frac{\Sigma_1 + \Sigma_2}{2}\right|}{\sqrt{|\Sigma_1| * |\Sigma_2|}}$$

where $\mu_2$ and $\mu_2$ are the mean vectors associated with distributions $g_1$ and $g_2$ and $\Sigma_1$ and $\Sigma_2$ are the respective covariance matrices.

12. The method of claim 10 further comprising:
    computing a centroid for said new distribution by minimizing the Bhattacharyya distance between said selected distributions.

13. The method of claim 10 wherein the centroid of the new distribution which contains Gaussian distributions $g_i$ with a weight of $w_i$, i=1, ..., N is computed in accordance with $$\mu_c = \frac{\sum_i w_i * (\sigma_c^2 + \sigma_i^2)^{-1} * \mu_i}{\sum_i w_i * (\sigma_c^2 + \sigma_i^2)^{-1}}$$

$$\sigma_c^2 = \frac{\sum_i w_i}{\sum_i w_i * \left[\frac{2}{\sigma_c^2 + \sigma_i^2} - \left(\frac{\mu_c - \mu_i}{\sigma_c^2 + \sigma_i^2}\right)^2\right]}$$

where $\sigma^2$ is the variance and $\mu$ is the mean associated with a specific component of the feature vector.

* * * * *

UNITED STATES PATENT AND TRADEMARK OFFICE
CERTIFICATE OF CORRECTION

PATENT NO. : 6,526,379 B1
DATED : February 25, 2003
INVENTOR(S) : Luca Rigazio et al.

It is certified that error appears in the above-identified patent and that said Letters Patent is hereby corrected as shown below:

Column 5,
Lines 6 and 36, after "corresponding" insert -- to --

Column 6,
Line 3, after "corresponding" insert -- to --
Line 24, "$\mu_2$ and $\mu_2$" should be -- $\mu_1$ and $\mu_2$ --

Signed and Sealed this

Nineteenth Day of August, 2003

JAMES E. ROGAN
*Director of the United States Patent and Trademark Office*